US010771624B1

(12) United States Patent
Penar et al.

(10) Patent No.: US 10,771,624 B1
(45) Date of Patent: Sep. 8, 2020

(54) DATA STORE FOR COMMUNICATION AUTHENTICATION (71) Applicant: Microsoft Technology Licensing, LLC, Redmond, WA (US)

(72) Inventors: Russell Andrew Penar, Highlands Ranch, CO (US); Amer Aref Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/375,599

(22) Filed: Apr. 4, 2019

(51) Int. Cl.
*H04M 3/436* (2006.01)
*H04M 3/42* (2006.01)
*H04L 9/32* (2006.01)
*H04L 29/06* (2006.01)

(52) U.S. Cl.
CPC .......... *H04M 3/436* (2013.01); *H04L 9/3247* (2013.01); *H04L 63/0876* (2013.01); *H04M 3/42102* (2013.01)

(58) Field of Classification Search
CPC ....... H04W 12/1008; H04W 12/00514; H04W 12/06; H04W 12/12; H04M 3/42042; H04M 3/436; H04M 3/42102; H04M 3/42059; H04M 3/4365; H04M 7/0078; H04M 15/06; H04M 15/47; H04M 15/83; H04M 15/8351; H04M 17/02; H04L 9/3247; H04L 63/08; H04L 63/0876; H04L 63/136; H04L 65/1069; H04L 65/1076
USPC .......................... 379/142.05, 142.17, 142.06
See application file for complete search history.

(56) References Cited

U.S. PATENT DOCUMENTS

| | | |
|---|---|---|
| 6,393,112 B1 | 5/2002 | Gottlieb et al. |
| 6,768,792 B2 | 7/2004 | Brown et al. |
| 7,103,172 B2 | 9/2006 | Brown et al. |
| 7,110,514 B2 | 9/2006 | Brown et al. |
| 7,751,384 B1 | 7/2010 | Paterik |
| 8,144,850 B2 | 3/2012 | Brown et al. |
| 8,744,062 B2 | 6/2014 | Pickford |
| 8,818,344 B2 | 8/2014 | Forbes et al. |

(Continued)

OTHER PUBLICATIONS

"Non Final Office Action Issued in U.S. Appl. No. 16/375,562", dated Nov. 8, 2019, 16 Pages. (MS# 405868-US-NP).

(Continued)

*Primary Examiner* — Binh Kien Tieu
(74) *Attorney, Agent, or Firm* — Schwegman Lundberg & Woessner, P.A.

(57) ABSTRACT

Techniques for authenticating pending communication sessions between user devices are disclosed herein. In an example, a data store performs operations to: store device authentication information for an initiating device specific to a pending communication session between the initiating device and a receiving device, wherein the first authentication information comprises at least a timestamp and identifier for the initiating device; store second authentication information from a service provider of the initiating device; provide the second authentication information to a service provider of the receiving device to authenticate the pending communication session prior to routing the pending communication to the receiving device; and provide the first authentication information to the receiving device to verify authenticity of the pending communication session.

20 Claims, 6 Drawing Sheets

(56) References Cited

U.S. PATENT DOCUMENTS

| | | | | |
|---|---|---|---|---|
| 8,923,505 | B2 | 12/2014 | Mergen | |
| 9,001,985 | B2* | 4/2015 | Cox | H04M 15/06 |
| | | | | 379/114.14 |
| 9,025,747 | B2* | 5/2015 | Chmara | H04M 1/57 |
| | | | | 370/352 |
| 9,332,119 | B1* | 5/2016 | Danis | H04M 3/42042 |
| 9,654,641 | B1 | 5/2017 | Chishti et al. | |
| 9,979,818 | B2* | 5/2018 | Farris | H04M 3/4365 |
| 9,984,049 | B2 | 5/2018 | Soundararajan et al. | |
| 10,462,292 | B1* | 10/2019 | Stephens | H04M 3/436 |
| 2004/0236696 | A1 | 11/2004 | Aoki et al. | |
| 2006/0253895 | A1 | 11/2006 | Brandofino et al. | |
| 2014/0302814 | A1 | 10/2014 | Roncoroni et al. | |
| 2015/0063166 | A1 | 3/2015 | Sif et al. | |
| 2015/0063552 | A1* | 3/2015 | Bender | H04L 9/3215 |
| | | | | 379/142.05 |
| 2016/0112397 | A1* | 4/2016 | Mankovskii | H04L 63/105 |
| | | | | 726/6 |
| 2017/0316409 | A1 | 11/2017 | Smith et al. | |
| 2018/0026799 | A1* | 1/2018 | Pottier | H04L 9/3265 |
| | | | | 713/156 |
| 2018/0097842 | A1* | 4/2018 | Roskind | G06F 21/55 |
| 2018/0255130 | A1 | 9/2018 | Kozloski et al. | |
| 2018/0343266 | A1 | 11/2018 | Lotter et al. | |
| 2019/0266347 | A1* | 8/2019 | Indukuri | H04L 9/0894 |
| 2019/0385165 | A1* | 12/2019 | Castinado | G06Q 20/352 |

OTHER PUBLICATIONS

"Blocking the Unwanted with AI in the Blockchain", Retrieved From: https://robocalls.io/, Dec. 10, 2018, 16 pages.

"Real-Time Call Verification", Retrieved From: https://nextcaller.com/, Retrieved on: Jan. 25, 2019, 1 Page.

"Stir and Shaken Overview", Retrieved From: https://transnexus.com/whitepapers/stir-and-shaken-overview/, Retrieved on: Jan. 25, 2019, 4 Pages.

"Tech Mahindra and Microsoft Enable a Robust Blockchain-Based Ecosystem to Fight Spam Calls in India", Retrieved From: https://news.microsoft.com/en-in/tech-mahindra-and-microsoft-enable-a-robust-blockchain-based-ecosystem-to-fight-spam-calls-in-india/, Aug. 27, 2018, 4 Pages.

"The Evolution of Caller ID for Mobile, IP, and OTT", In White Paper of Neustar, Retrieved on: Jan. 25, 2019, 10 Pages.

"Non-Provisional Application Filed in U.S. Appl. No. 16/008,893", filed Jun. 14, 2018, 75 Pages.

Ljungstrand, Peter, "Context Awareness and Mobile Phones", In Journal of Personal and Ubiquitous Computing, vol. 5, Issue 1, Feb. 2001, pp. 58-61.

Mceachern, Jim, "Robocalling and Caller ID Spoofing—Detect, Mitigate and Deter", Retrieved From: https://sites.atis.org/insights/robocalling-and-caller-id-spoofing-detect-mitigate-and-deter/, Dec. 15, 2016, 5 Pages.

Reaves, et al., "AuthentiCall: Efficient Identity and Content Authentication for Phone Calls", In Proceedings of 26th USENIX Security Symposium, Aug. 16, 2017, pp. 575-592.

Sathe, Gopal, "Drupe Lets You Send GIFs While Making Calls. The Best Thing Ever?", , Aug. 16, 2017, 4 Pages.

Schmidt, et al., "Context-Aware Telephony Over WAP", In Journal of Personal and Ubiquitous Computing, vol. 4, Issue 4, Jan. 8, 2000, pp. 1-5.

* cited by examiner

FIG. 6

DATA STORE FOR COMMUNICATION AUTHENTICATION

TECHNICAL FIELD

This document pertains generally, but not by way of limitation, to voice and data communication, and particularly but not by way of limitation to authentication of incoming communications using a trusted and secure data store.

BACKGROUND

Caller identification (caller ID) was created to alert a called party of the originating source of an incoming call. This way, the called party is able to make an informed decision about whether or not to accept the incoming call. However, caller ID spoofing has been used to trick a called party into thinking the source of an incoming call is different than the actual source. For example, the caller may spoof their number to make the called party think a neighbor is calling. This has been used to subject called parties to scams, spammers, or even swatting attacks.

To combat caller ID spoofing, secure telephony identity revisited (STIR) and secure handling of asserted information using tokens (SHAKEN) were developed. SHAKEN/STIR use cryptographic identity headers to provide confirmation of identity to a called party. The identity headers are passed to the called party with the call itself, which requires the call to be carried out end-to-end on an Internet Protocol (IP) network. However, some calls are still routed through the public switched telephone network (PSTN), for example, which strips the call of extra fields, removing the ability for the called party to authenticate the call using SHAKEN/STIR.

SUMMARY

The present inventors have recognized, among other things, that the use of a trusted and secure data store provides a reliable method of authenticating an incoming call regardless of the route through which the communication travels. This way, if the call must be routed through the PSTN, for example, the receiver of the call is still able to verify the authenticity of the call.

In an example, a method includes storing, by a data store, first authentication information for an initiating device specific to a pending communication session between the initiating device and a receiving device, wherein the first authentication information comprises at least a timestamp and identifier for the initiating device; storing, by the data store, second authentication information from a service provider of the initiating device; providing, by the data store, the second authentication information to a service provider of the receiving device to authenticate the pending communication session prior to routing the pending communication to the receiving device; and providing, by the data store, the first authentication information to the receiving device to verify authenticity of the pending communication session.

In another example, a data store for providing authentication for pending communications includes a processor and a memory. The memory includes instructions, which when executed by the processor, causes the data store to perform operations that include: storing device authentication information for an initiating device specific to a pending communication session between the initiating device and a receiving device, wherein the first authentication information comprises at least a timestamp and identifier for the initiating device; storing second authentication information from a service provider of the initiating device; providing the second authentication information to a service provider of the receiving device to authenticate the pending communication session prior to routing the pending communication to the receiving device; and providing the first authentication information to the receiving device to verify authenticity of the pending communication session.

In another example, a data storage apparatus includes means for storing device authentication information for an initiating device specific to a pending communication session between the initiating device and a receiving device, wherein the first authentication information comprises at least a timestamp and identifier for the initiating device; means for storing second authentication information from a service provider of the initiating device; means for providing the second authentication information to a service provider of the receiving device to authenticate the pending communication session prior to routing the pending communication to the receiving device; and means for providing the first authentication information to the receiving device to verify authenticity of the pending communication session.

Each of these non-limiting examples or aspects can stand on its own, or can be combined in various permutations or combinations with one or more other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

A system and method are disclosed herein that utilize a trusted and secure data store to provide authentication and context information for a pending communication session. An initiator (e.g., a user placing a telephone call or initiating a web conference) initiates an outgoing communication intended for a receiver (e.g., a user receiving the telephone call or the web conference request). Upon initiating the communication session by placing an outgoing communication, the initiator's device uploads authentication information and context information to a trusted and secure data store. The outgoing communication is routed to the initiator's service provider, which can upload additional authentication information to the trusted and secure data store. The initiator's device and the initiator's service provider are able to upload information to the data store based on a trusted relationship with the data store. This way, spoofers or other nefarious actors are unable to add false authentication data to the data store because they do not have that trusted relationship.

The communication is received by the receiver's device through the receiver's service provider. In some examples, the initiator's service provider can be the same as the receiver's service provider. In other examples, the communication can be routed to the receiver's service provider from the initiator's service provider through other service providers, the public switched telephone network (PSTN), or any other network, for example. Upon receiving the communication, the receiver's service provider can interrogate the data store for authentication information regarding the communication. This can be the authentication information uploaded by the initiator's service provider, for example. If the receiver's service provider determines the incoming communication is not authentic, the receiver's service provider may terminate the communication prior to forwarding on to the receiver, or provide an indication that the communication could not be authenticated.

Upon receipt of the incoming communication, the receiver's device can interrogate the data store for the authentication and context information. The receiver's device reviews the authentication information to confirm the identity of the initiator. A display of the receiver's device can also display the context information to the receiver. The context information can include additional information beyond a calling name and number. For example, a logo, context blurb, or other information can be displayed to the receiver in addition to the calling name and number. The display can also indicate that the call has been authenticated. If no authentication information exists for the communication, the receiver can choose to ignore the communication. This way, the receiver is able to confirm the authenticity of the communication regardless of the network through which the communication was routed.

Figure 1:
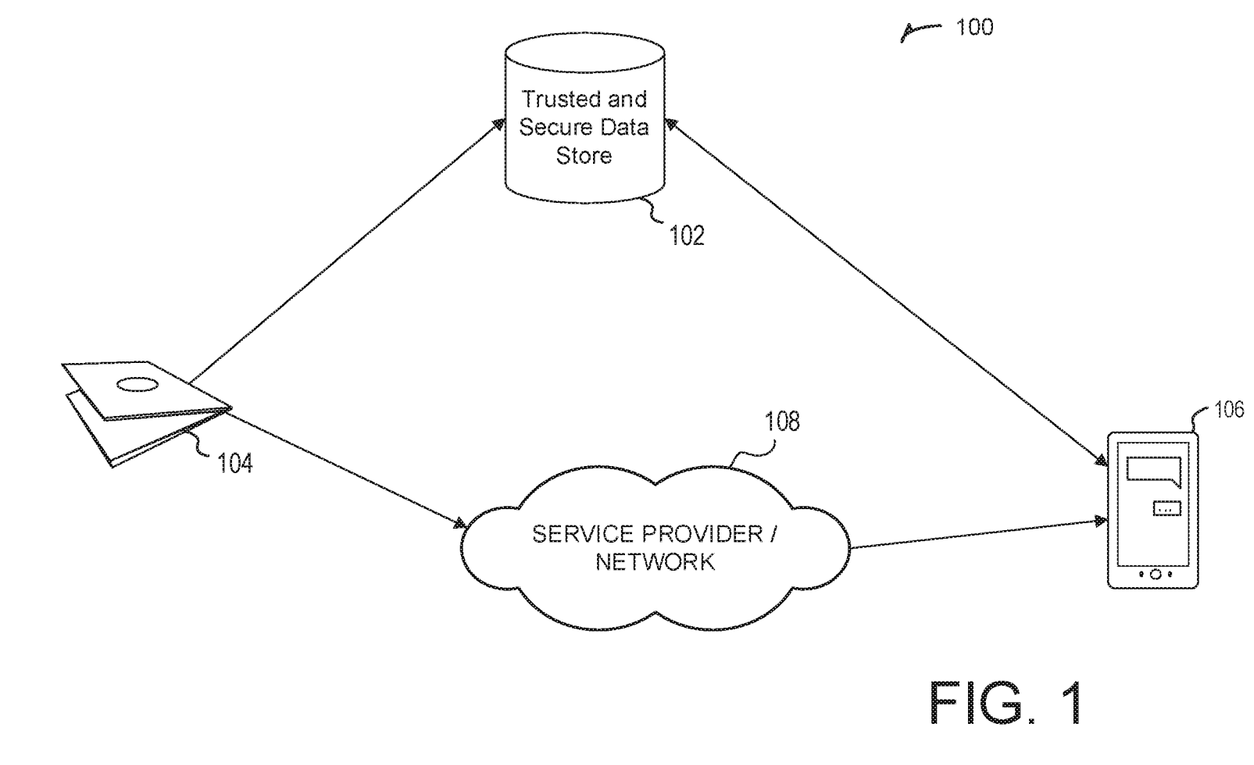
FIG. 1 is a diagram illustrating a communication system that includes two devices communicating over a shared service provider.

FIG. 1 is a diagram illustrating a communication system 100 that includes two devices communicating over a shared service provider. System 100 includes data store 102, user devices 104 and 106, and service provider 108. While illustrated as a laptop in FIG. 1, the user device 104 can be any device capable of initiating and receiving communications including voice communications, video communications, textual communications, or any other form of a communication through the service provider 108. Likewise, while illustrated as a smartphone in FIG. 1, the user device 104 can be any device capable of initiating and receiving communications including voice communications, video communications, textual communication, or any other form of a communication through the service provider 108.

The service provider 108 is any provider that provides communication capability for user devices 104 and 106. For example, the service provider 108 can be an internet service provider (ISP), telecommunications service provider (TSP), or any other network provider for user devices 104 and 106. For example, the service provider 108 may be an ISP and the user devices 104 and 106 may communicate through voice-over-IP (VoIP).

Figure 3:
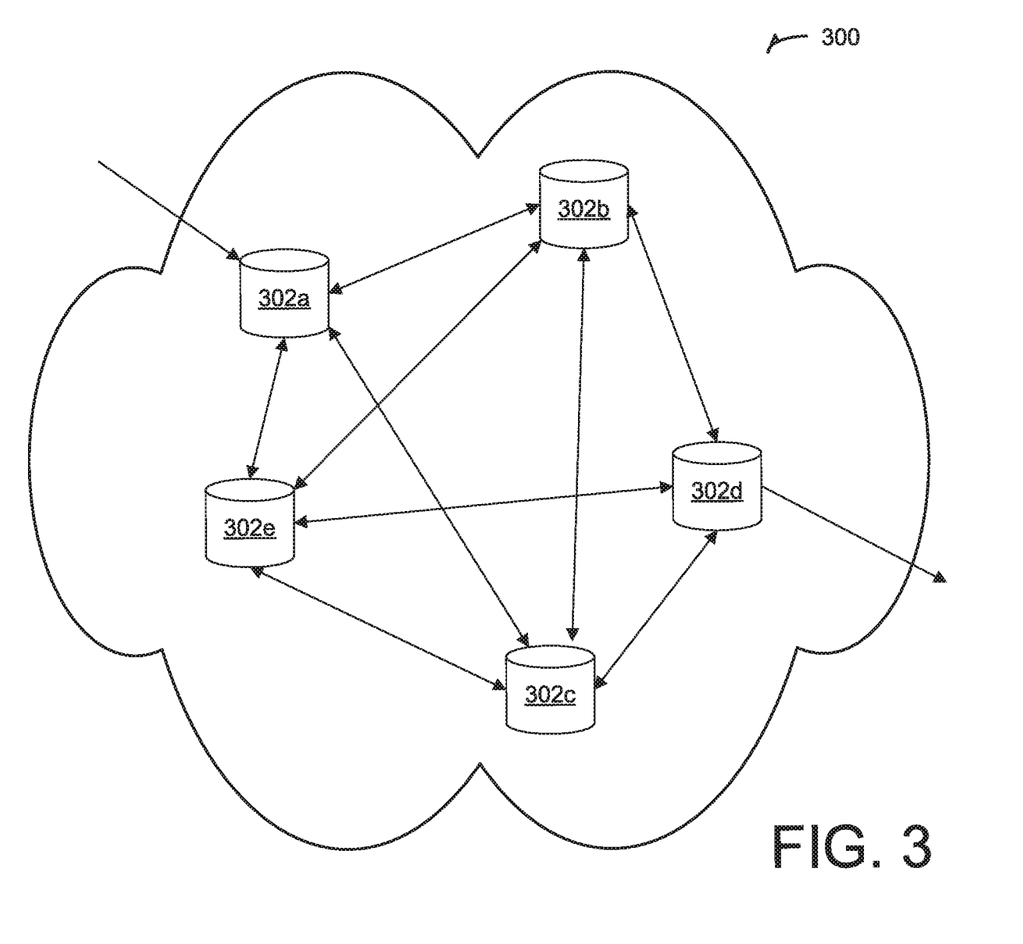
FIG. 3 is a diagram illustrating an example distributed data store used for providing authentication and context information for communication.

The data store 102 is a trusted and secure data store configured to communicate data with the user devices 104 and 106, along with many other user devices. The data store 102 can be a distributed ledger (an example of which is illustrated in FIG. 3), a centralized database (using one more servers at a single location, for example), or any other form of data storage. User devices, such as the user devices 104 and 106, can only communicate with the data store 102 through a trusted and secure communication. For example, when a user purchases a smartphone, the smartphone service provider may verify the identity of the user (e.g., through a valid identification card), and set up a trusted connection between the smartphone and the data store 102. For example, the smartphone can be programmed with a private encryption key and/or cryptographic signature that allows the data store 102 to confirm that the smartphone is authorized to upload data to the data store 102.

In an example, the user device 104 can initiate a communication session, such as a voice call, web conference, text message, electronic mail (e-mail), or other communication intended for the user device 106. Upon initiating the communication, the user device 104 can upload authentication and context information to the data store 102 through a trusted and secure connection. For example, the user device 106 can use a cryptographic signature and send the authentication and context information to the data store 102. The connection between the user device 104 and the data store can be through the service provider 108, or through any other network connection.

Upon receiving the authentication and context information, the data store 102 can store the information in a record for that communication. The record can be indexed using an identifier provided by the user device 106, or any other unique value specific to the communication. The authentication information can be any data that allows a receiving device to confirm the identity of the initiator (e.g., a user of the user device 104) of the communication. In one example, the authentication information can include an identifier and a timestamp. The identifier can be indicative of the user, the device, or both, and the timestamp can be a time at which the communication was initiated.

The service provider 108 receives the outgoing communication from the user device 104 and routes the communication to user device 106. In one example, upon receiving the incoming communication, the user device 106 can interrogate the data store 102 for authentication and context information regarding the incoming communication. The user device 106 can use an incoming telephone number or other identifier to index into the data store 102 to obtain a respective record. In another example, the data store 102 can be configured to autonomously provide the authentication and context information to the user device 106 without inquiry from the user device 106 itself. For example, the authentication and context information can include an identifier of the receiving device such that the data store 102 knows where to send the authentication and context information.

If a record exists for the incoming communication, the user device 106 can confirm the authenticity of the communication, and display the context information to a user. For example, the user device 106 can check the identification and timestamp of the authentication to confirm that the identity matches that of the incoming communication, and that the timestamp is within a threshold time of the communication (e.g., 30 seconds). If the authentication information matches the incoming call, the user device 106 can indicate to a user, on a display or otherwise, that the pending communication session has been authenticated. In another example, the authentication information can include a cryptographic signature. The data store 102 or the user device 106 can use a public key associated with an identifier for the user device 104 (e.g., telephone number). If the key decrypts properly using the public key for that number, the communication session can be authenticated. Once the user device 106 knows whether the communication session is authenticated, the user of the user device 106 can then make an informed decision about accepting the incoming communication.

If no record exists for the incoming communication, the user device 106 can determine that the communication is most likely not genuine, and can ignore or decline the communication. In another example, the user device 106 can be configured to automatically deny the incoming communication if no authentication data is received from the data store 102 for the incoming communication. The user device 106 can perform the interrogation and authentication check using any combination of hardware and/or software. For example, a telephone call program, a web conference program, a text message program, and/or an email program can be configured to execute, by a processor of the user device 106, the interrogation of the data store 102 and the subsequent authentication and display of the context information received from the data store 102.

Figure 2:
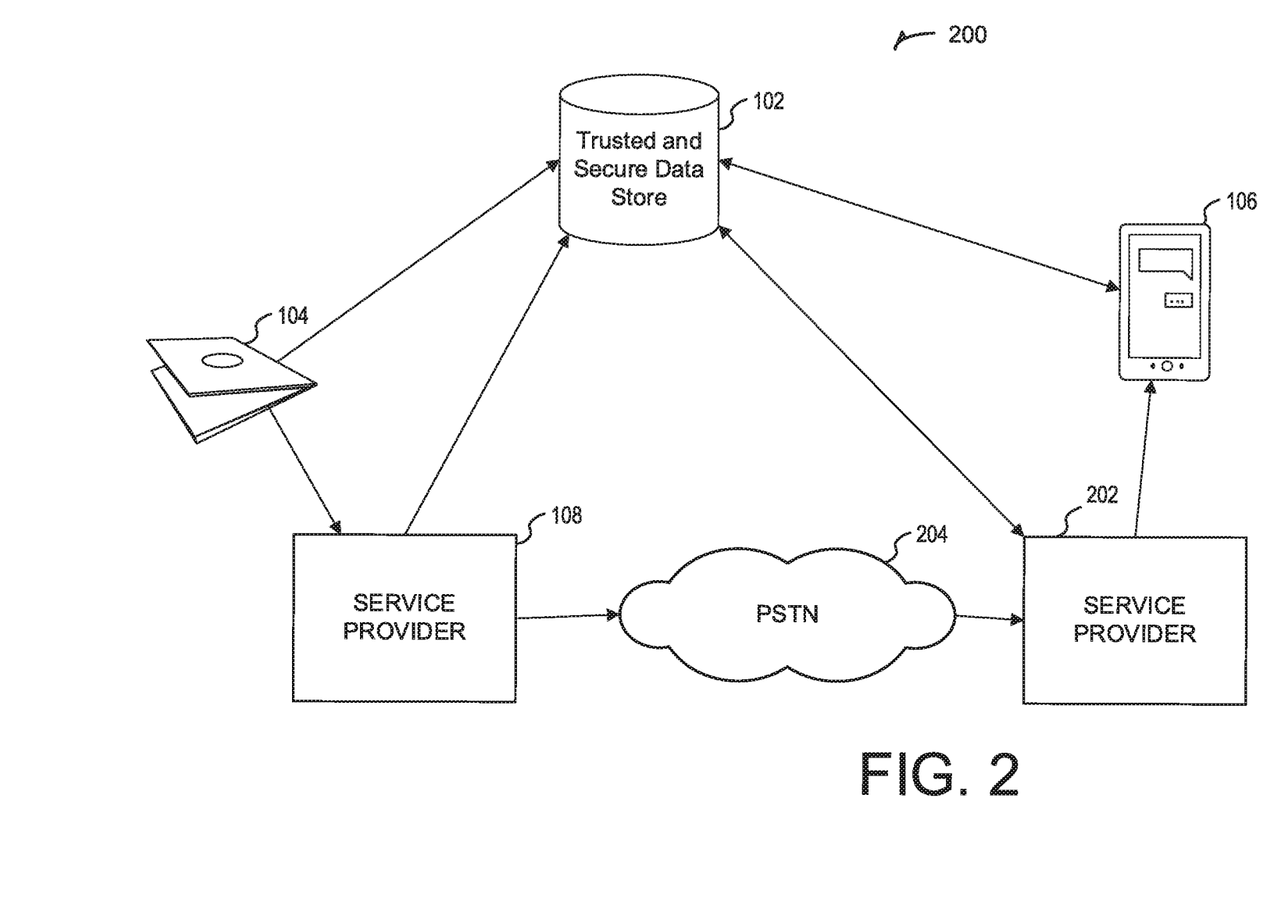
FIG. 2 is a diagram illustrating a communication system that includes two devices communicating through multiple service providers.

FIG. 2 is a diagram illustrating a communication system 200 that includes two devices communicating through multiple service providers. System 200 includes the data store 102, the user devices 104 and 106, service providers 108 and 202, and public switched telephone network (PSTN) 204. In the example illustrated in FIG. 2, the user devices 104 and 106 do not share a common service provider. While illustrated as two service providers 108 and 202, a communication between the user devices 104 and 106 can be routed through any number of service providers.

Some users may have user devices that are not voice over IP (VoIP) capable or otherwise require a communication to be routed through a switched network, such as the PSTN 204. When routed through the PSTN 204, identity headers, which may be added in methods such as STIR and SHAKEN, are stripped from the communication. Therefore, the user device 106 would not be able to verify the authenticity of a communication from the user device 104 using techniques such as STIR and SHAKEN. By using the trusted and secure data store 102 to authenticate incoming communication, the called device (e.g., the user device 106), can authenticate the incoming communication regardless of whether or not the communication is routed through the PSTN 204.

The service providers 108 and 202 are capable of performing additional authentication using the data store 102. When the user device 104 initiates a pending communication session and routes an outgoing communication to its service provider 108, the service provider 108 can upload further authentication information to the data store 102. For example, the service provider 108 can verify that the device (e.g., the user device 104) is an active and trusted device on its network. Upon verification, the service provider 108 can upload provider authentication information to the data store 102. The provider authentication information can include identifiers, timestamps, or any other data and can be stored as a separate record, or appended onto the already existing record from the user device 104. Uploading of the provider authentication information can be performed by one or computer systems of the service provider 108.

The communication is routed until it reaches the receiving device's (terminating) service provider 202. While not illustrated, the communication may be routed through any number of service providers prior to arriving at the terminating service provider 202. Upon receipt of the incoming communication, the service provider 202 can interrogate the data store 102 for the provider authentication data. The service provider 202 can index into the data store 102 using an identifier of the communication, for example. If a record exists, the service provider 202 receives the provider authentication data and verifies that the service provider 108 confirmed that the user device 104 is a trusted device on that network. In some examples, if no record with provider authentication information exists, the service provider 202 may determine not to route the call to the user device 106. In another example, the service provider 202 can route the communication to the user device 106 along with an indication that it was not able to authenticate the communication. The interrogation and authentication of the provider authentication information can be performed by one or more computer systems of the service provider 202.

Uploading of information from the user device 104 and interrogation of the data store 102 by the user device 106 can occur in a similar manner as discussed above with respect to FIG. 1. Thus, for the example in FIG. 2, both the terminating service provider 202 and the receiving user device 106 can verify the authenticity of the communication, providing further protection against identity spoofing.

In some examples, upon receipt of the authentication information by either the service provider 202 or the user device 106, the respective records within the data store 102 can be removed from the data store 102. This can be advantageous to prevent mining of data, for example. The records can be completely removed from the data store 102, or can just have public accessibility to the records removed.

FIG. 3 is a diagram illustrating a data store system 300 which is one example of an implementation for the data store 102. The data store system 300 is a distributed data store, such as a distributed ledger, in which the data is replicated across all systems 302*a*-302*e*, which may or may not be geographically co-located. While illustrated as five systems in FIG. 3, any number of systems can be used for the distributed data store system 300. The data store system 300 can be implemented in a similar manner to blockchain. However, blockchain is generally considered to be immutable, whereas in some examples, it may be desirable to frequently remove public access to records from the data store 102 to prevent data mining, for example.

Each system 302*a*-302*e* is capable of receiving and storing records from an initiating device, such as the user device 104, and is capable of receiving requests for records from a receiving device, such as the user device 106. Because of this, it must be ensured that the authentication and context data is replicated across the systems 302*a*-302*e* in a short enough time that it is ensured that the data record(s) will be available when requested from the receiving device. For example, if an initiating device uploads authentication and context information to the system 302*a*, and a receiving device interrogates the system 302*d*, the authentication and context information must be replicated to the system 302*d* from the system 302*a* fast enough to ensure it is available for the receiving device to both authenticate the communication from the initiating user device and display the context information to the user.

Figure 4:
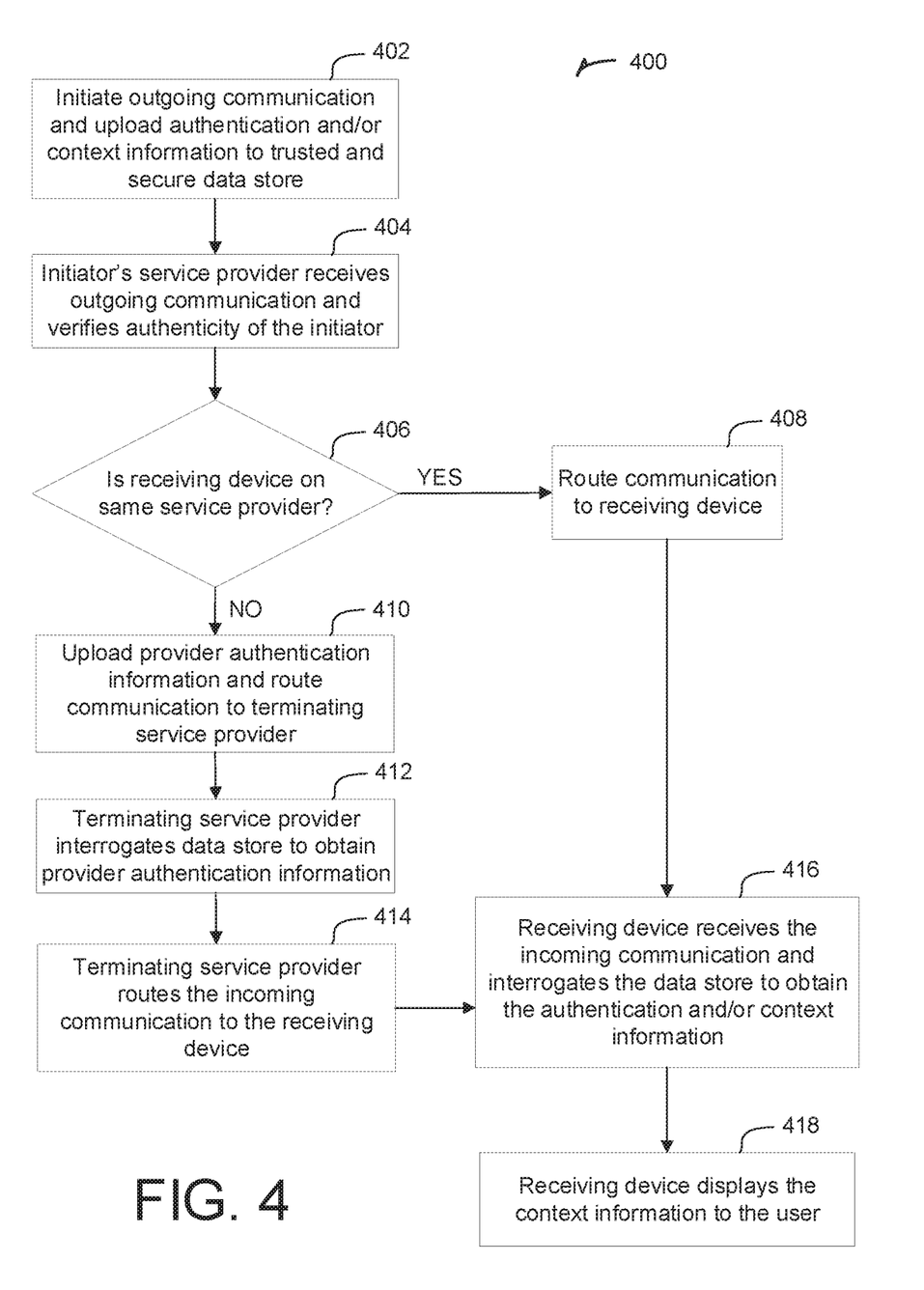
FIG. 4 is a flow chart illustrating a method of authenticating an initiator of an incoming communication using a data store.

FIG. 4 is a flowchart illustrating a method 400 of authenticating a pending communication session between user devices and providing context for the communication session. At step 402, a user of a user device initiates a pending communication session. The communication session can be a voice call, a web conference, a text message, an email, or any other communication between user devices. Upon initiation of the communication session, the initiator device uploads authentication and context information to the data store. The data is uploaded based on a trusted and secure relationship between the data store and the user device. This is to ensure that a user cannot spoof an identity by uploading false data to the data store. The uploading of information to the data store can be accomplished by software and/or hardware of the user device. For example, a telephone application running on the user device can initiate the communication and upload the authentication and context information contemporaneously. The information can be encrypted using a private key, for example, or can be provided with a cryptographic signature.

Following initiation, the communication is routed from the initiating device to the initiator's service provider. At step 404, the initiator's service provider receives the communication and verifies that the initiator's device is active and trusted on the network. At step 406, the initiator's service provider determines if the receiving device is also part of the same network. If so, method 400 proceeds to step 408 and routes the communication to the receiving device. If not, method 400 proceeds to step 410 and uploads provider authentication information to the data store. The provider authentication information can include, for example, a timestamp, and identification information that can include, for example, an identification of the initiator's device and the initiator's service provider. The provider authentication data can be used to guard against a situation in which an inactive device (e.g., stolen) is used by a scammer, for example, and is able to upload false or untrustworthy authentication information to the data store.

The communication is routed from the initiator's service provider to the receiver's, or terminating, service provider. At step 412, the receiver's service provider receives the incoming communication and requests information from the data store. The receiver's service provider can index into the data store using an identifier of the communication. For example, for a telephone call, the receiver's service provider can index into the data store using the initiator's telephone number, which the service provider can determine from the communication itself. If a record exists, the data store provides the information to the receiver's service provider so that the receiver's service provider can authenticate the call. If a record does not exist, the receiver's service provider can either terminate the communication, or provide an indication to the receiving device that the communication could not be authenticated. In some examples, the record can be removed from the data store upon provision of the authentication information to the receiver's service provider.

At step 414, the receiver's service provider routes the communication to the receiving device. At step 416, the receiving device receives the communication and requests information from the data store regarding the communication. The receiving device can index into the data store using an identifier received with the communication, for example. If a record exists, the authentication and context information is provided to the receiving device. In some examples, only authentication information or only context information may be provided in a record. In some examples, the record may be removed from the data store upon provision of the authentication and context information to the receiving device. This can be done to prevent mining of public data, for example. If no record exists, the receiving device can automatically decline the communication, or can provide an indication to the user indicating that the communication could not be authenticated. At step 418, the receiving device displays the context information to the user.

Figure 5A:
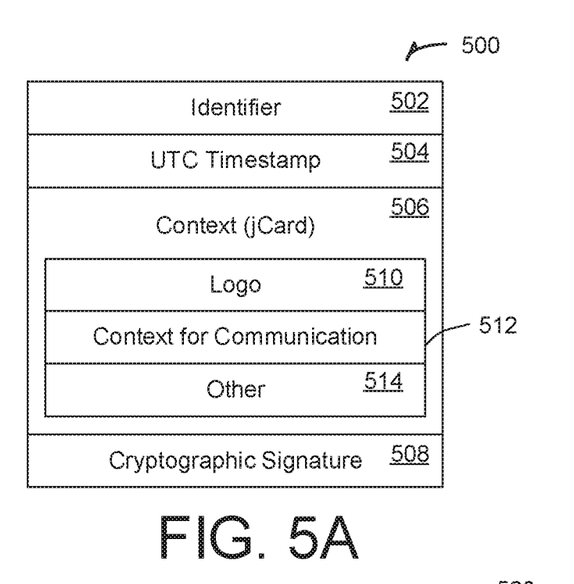
FIG. 5A is a diagram illustrating an example record written to a data store for authentication and context information regarding a communication.

FIG. 5A is a diagram illustrating an example record 500 written to a data store for authentication and context information regarding a communication. The record 500 can be written by the user device 104, for example. The service provider 108 can append authentication information to the record 500 or can upload a separate record to the data store that includes the provider authentication information. The record 500 includes an identifier 502, a timestamp 504, context information 506, and a cryptographic signature 508. The context information 506 can include a logo 510 (or other image data), context for the communication 512, and other data 514.

The identifier 502 can be any information that identifies a device and/or user of the device. For example, the identifier 502 can include a telephone number, IP address, media access control (MAC) address, email address, personal name, username, or other identifier. The timestamp 504 can indicate the time at which the communication was initiated and can be in coordinated universal time (UTC) or any other time standard. A receiving device that obtains the record 500 from the data store can verify that the identifier 502 matches that of the incoming communication, and that the timestamp is within a threshold amount of time (e.g., 30 seconds). The context information 506 can be stored in any data format. In one example, the context information 506 can be a virtual context file (VCF) provided in JavaScript object notation (JSON) format (jCard). The jCard can be used by the receiving device to display the context information to a user.

Figure 5B:
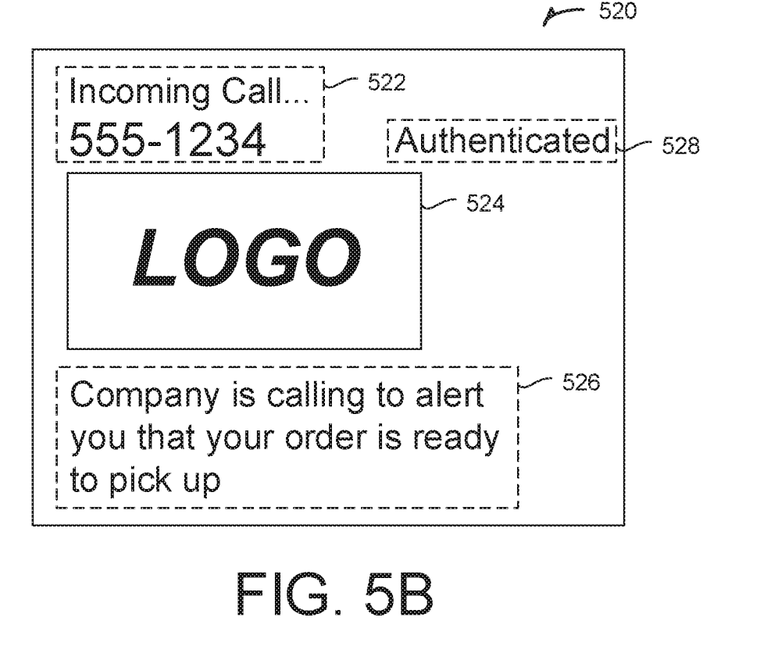
FIG. 5B is a diagram illustrating an example display of a receiving device upon receipt of an incoming communication.

FIG. 5B is a diagram illustrating an example display 520 of a receiving device upon receipt of an incoming communication. The receiving device obtained context information, such as that illustrated in FIG. 5A, from the data store upon receipt of the incoming communication. The display 520 includes an identification 522, logo 524, communication context 526, and authentication 528. Other examples can include more or fewer fields for the display 520. The identification 522 can indicate the incoming communication and identification information regarding the incoming communication. This can include a telephone number, personal name, username, email address, or any other identifier. The logo 524 can be a company logo, or any other image data that an initiator wishes to display to the receiver. For example, a company logo can be included in the context information when any person(s) from the company places an outgoing communication.

The communication context 526 can be a text blurb that provides a textual description for the communication. As illustrated in FIG. 5B, a company can indicate that an order is ready to pick up. The communication context 526 can help a user determine whether or not they want to accept the communication, beyond simply knowing who is calling. For example, a user may wish to accept a call from a company regarding an order that was placed while not wishing to accept a call from the same company regarding an advertisement.

The display 520 can also indicate to the user that the incoming communication has been authenticated. For example, the authentication 528 field can indicate that the incoming communication was not authenticated if a record for the incoming communication did not exist in the data store. This provides the user with further information to make an informed decision about whether or not to accept an incoming communication.

Figure 6:
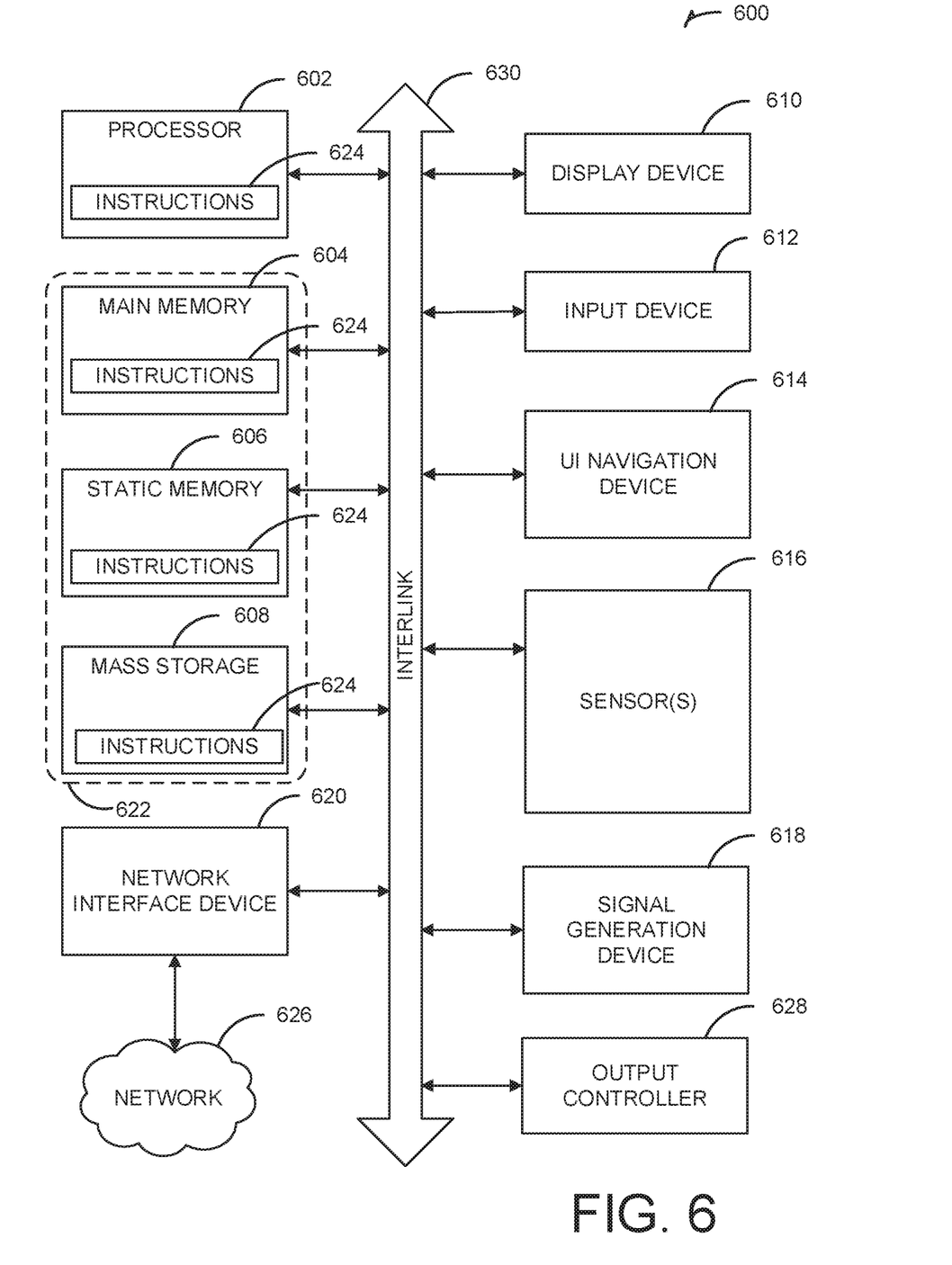
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. For example, the machine 600 can be any one or more of the data store 102, user devices 104 and 106, computers of the service providers 108 and 202, or any of the systems 302*a*-302*e*. the Examples, as described herein, may include, or may operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drive, tape drive, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine readable media 622. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.16.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:

transmitting first authentication information to a data store from an initiating device of a pending communication session based on a trusted relationship with the data store, the first authentication information comprising at least a timestamp and identifier for the initiating device;

storing, by the data store, the first authentication information;

generating, by an initiating service provider, second authentication information indicating that the initiating device is a trusted device on a network of the initiating service provider in response to the initiating device initiating the pending communication session on the network of the initiating service provider;

transmitting the second authentication information to the data store;

storing, by the data store, the second authentication information;

providing, by the data store, the second authentication information to a receiving service provider in response to the pending communication session being routed to a network of the receiving service provider;

routing the pending communication session to a receiving device of the pending communication session in response to the receiving service provider confirming authenticity of the initiating device using the second authentication information; and providing, by the data store, the first authentication information to the receiving device to verify authenticity of the pending communication session.

2. The method of claim 1, further comprising:

removing access to the first authentication information upon provision of the first authentication information to the receiving device; and removing access to the second authentication information upon provision of the second authentication information to the receiving service provider.

3. The method of claim 1, wherein the data store is provided by a distributed ledger.

4. The method of claim 1, wherein providing, by the data store, the first authentication information to the receiving device to verify authenticity of the pending communication session is responsive to receiving, by the data store, a request for the first authentication information from the receiving device.

5. The method of claim 1, wherein the pending communication session is routed from the network of the initiating service provider to the network of the receiving service provider through a public switched telephone network.

6. The method of claim 1, wherein the first authentication information further comprises a cryptographic signature.

7. The method of claim 1, wherein providing, by the data store, the first authentication information to the receiving device to verify the authenticity of the pending communication session comprises indicating to a user of the receiving device whether a communication session is authentic using the first authentication information.

8. A system comprising:
- a data store for providing authentication for a pending communication session;
- an initiating device configured to transmit first authentication information to the data store for the pending communication session based on a trusted relationship with the data store, the first authentication information comprising at least a timestamp and identifier for the initiating device, wherein the data store is configured to store the first authentication information;
- an initiating service provider configured to generate second authentication information indicating that the initiating device is a trusted device on a network of the initiating service provider in response to the initiating device initiating the pending communication session on the network of the initiating service provider, wherein the initiating service provider is configured to transmit the second authentication information to the data store, and wherein the data store is configured to store the second authentication information;
- a receiving device; and
- a receiving service provider configured to receive the second authentication information in response to the pending communication session being routed to a network of the receiving service provider, wherein the receiving service provider is configured to route the pending communication session to the receiving device in response to confirming authenticity of the initiating device using the second authentication information;
- wherein the receiving device is configured to receive the first authentication information to verify authenticity of the pending communication session.

9. The system of claim 8, wherein the data store is further configured to:
- remove access to the first authentication information upon provision of the first authentication information to the receiving device; and
- remove access to the second authentication information upon provision of the second authentication information to the receiving service provider.

10. The system of claim 8, wherein the data store is provided by a distributed ledger.

11. The system of claim 8, wherein the data store is configured to provide the first authentication information to the receiving device to verify authenticity of the pending communication session responsive to receiving a request for the first authentication information from the receiving device.

12. The system of claim 8, wherein the pending communication session is routed from the network of the initiating service provider to the network of the receiving service provider through a public switched telephone network.

13. The system of claim 8, wherein the first authentication information further comprises a cryptographic signature.

14. The system of claim 8, wherein the receiving device is further configured to indicate to a user of the receiving device whether a communication session is authentic using the first authentication information.

15. A system comprising:
- means for generating first authentication information based on a trusted relationship of an initiating device of a pending communication session, the first authentication information comprising at least a timestamp and identifier for the initiating device;
- means for storing the first authentication information;
- means for generating second authentication information indicating that the initiating device is a trusted device on a network of an initiating service provider in response to the initiating device initiating the pending communication session on the network of the initiating service provider;
- means for storing the second authentication information;
- means for providing the second authentication information to a receiving service provider in response to the pending communication session being routed to a network of the receiving service provider;
- means for routing the pending communication session to a receiving device of the pending communication session in response to the receiving service provider confirming authenticity of the initiating device using the second authentication information; and
- means for the first authentication information to the receiving device to verify authenticity of the pending communication session.

16. The system of claim 15, further comprising:
- means for removing access to the first authentication information upon provision of the first authentication information to the receiving device; and
- means for removing access to the second authentication information upon provision of the second authentication information to the receiving service provider.

17. The system of claim 15, wherein the means for the first authentication information to the receiving device to verify authenticity of the pending communication session are responsive to means for receiving a request for the first authentication information from the receiving device.

18. The system of claim 15, wherein the pending communication session is routed from the network of the initiating service provider to the network of the receiving service provider through a public switched telephone network.

19. The system of claim 15, wherein the first authentication information further comprises a cryptographic signature.

20. The system of claim 15, further comprising means for indicating to a user of the receiving device whether a communication session is authentic using the first authentication information.

* * * * *